Oct. 16, 1962  W. KARG  3,058,288
CUTTING MECHANISM FOR REAPERS
Filed Sept. 21, 1959  4 Sheets-Sheet 1

INVENTOR
WILHELM KARG
BY Dicke, Craig & Freudenberg
ATTORNEYS

INVENTOR
WILHELM KARG

BY Dicke, Craig & Freudenberg

ATTORNEYS

Oct. 16, 1962  W. KARG  3,058,288
CUTTING MECHANISM FOR REAPERS
Filed Sept. 21, 1959  4 Sheets-Sheet 4

INVENTOR
WILHELM KARG
BY Dicke, Craig & Freudenberg
ATTORNEYS

United States Patent Office 3,058,288
Patented Oct. 16, 1962

3,058,288
CUTTING MECHANISM FOR REAPERS
Wilhelm Karg, Unterwengen, near
Heising, Allgau, Germany
Filed Sept. 21, 1959, Ser. No. 841,093
11 Claims. (Cl. 56—297)

The present invention relates to a cutting mechanism for reapers which is provided with a pair of cutters with a large number of cutting blades thereon which are movable relative to each other by means of a driving mechanism.

In cutting mechanisms for reapers it is essential for a proper cutting operation that the cutting blades fully engage with each other, which requires the cutters to be pressed against each other. On the other hand, the cutters should be designed so as to elude solid obstructions, for example, rocks, which might enter into the cutting mechanism.

In the known cutting mechanisms in which the lower cutter is formed by stationary fingers on which the upper cutters can move back and forth and are pressed against the lower cutter fingers by stationary pressure plates, the cutters are unyielding. Although attempts have been made to overcome this disadvantage by replacing the stationary pressure plates for the reciprocating cutters by resilient pressure arms which are movable together with the cutters, these attempts were only partly successful since the fingers serving as the lower cutters were rigid.

It is an object of the present invention to completely overcome the mentioned disadvantages of the known cutting mechanisms for reapers. According to the invention, this is attained by providing a cutting mechanism which operates with two cutters reciprocating relative to each other and supported and guided by a large number of swing arms which are mounted on the back rail of the cutting mechanism and are equally distributed over the entire length of the cutting mechanism so as to support and guide two sets of cutters at numerous points. These swing arms press the two cutters against each other in the most advantageous manner by being made of a resilient construction and thus forming resilient pressure arms which act upon the outer sides of the two cutters. Although for attaining the proper contact pressure of the cutters it would be sufficient if the swing arms of only one cutter are resilient, the cutting action and the protection against damage to the cutting mechanism by rocks and the like will be considerably improved by making the pressure arms for both cutters resilient. If any rocks should pass between the cutting blades, it will then be possible for both cutters to elude the obstructions.

By designing both sets of swing arms as resilient pressure arms and by thus attaining a considerable resilience of the two cutter rails, the further important advantage is attained that the cutting mechanism will be protected from damage even though very strong outer resistances act upon it, for example, if it should run against a border stone mounted in the field or if upon being lowered to its operating position, the cutting mechanism should hit upon a larger rock.

The resilient swing arms which act upon the two cutters are preferably not disposed above each other but in an offset relation to each other so that, due to the resilience of the blades of the two cutters relative to each other, they will yield to solid obstructions such as rocks and the like and be thus protected from being damaged. Also, since the cutters are held under spring pressure so as to close at any point, a clean cut of the cutting mechanism will at all times be insured.

The swing arms themselves and their connection with the cutters may be made of various designs. The swing arms may, for example, be rigid and pivotably connected to the rail of the cutting mechanism and acted upon by springs which press them against each other. The swing arms may also be designed so as to oppose the pivotal movement caused by the reciprocation of the two cutters. This will facilitate the driving of the cutters since at each reversal of the reciprocatory movements, the inertia of the cutters will be stored up by these resilient means and will again be freed at the subsequent movement of the cutters. This double resilience of the swing arms may be attained by mounting them in rubber bushings.

In order to permit the swing or pressure arms to be lifted from the cutters so that the latter may be renewed, these arms are mounted on pivotable bushings. Each of these bushings is clamped between a pair of biased leaf springs in such a manner that, when the arms are placed in the operative position, a moment of force is exerted upon them which is overcome or reversed in direction by a displacement of the leverage of the arms when they are tilted upwardly.

The present invention further provides means for adjusting the pressure under which the swing arms press the two cutters against each other and for compensating for any wear upon the cutters. These means consist of a bolt for adjusting the tension of the leaf springs of each swing arm.

Similarly as in the cutting mechanisms of all reapers, the cutting mechanism according to the invention is also provided at each end with an outer and inner shoe each of which carries a cutter plate serving as a counterblade for the first or last cutter blade of the two cutters, respectively.

These and further objects, features, and advantages of the present invention will also appear from the following detailed description of several preferred embodiments of the invention, particularly when read with reference to the accompanying drawings, in which—

FIGURE 9 shows a cross section of the cutting mechanism illustrating the inner shoe thereof; while

Figure 1:
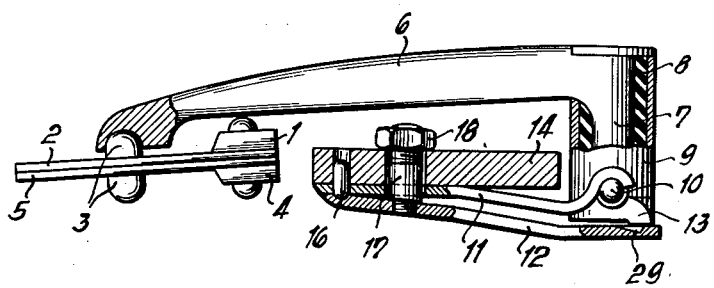
FIGURE 1 shows a transverse cross section of the cutting mechanism taken along section line I—I of FIGURE 5 and illustrating one of the upper swing or pressure arms with parts broken away for purposes of illustration.

As illustrated in the drawings, the upper cutter blade is formed by the rail 1 and by blades 2, mounted on the former by means of rivets 1'; while the lower cutter blade is formed by the rail 4 and blades 5, mounted on the former by means of rivets 4'. Cutter blades 2 and 5 have on their outer sides mushroom projections 3 which are adapted to engage into the upper swing or pressure arms 6 and the corresponding lower arms 19, respectively. Each upper arm 6 carries on its angular end 7 a rubber sleeve 8 and is inserted together with this rubber sleeve into a bushing 9. This bushing 9 is held by a pair of leaf springs 11 and 12, one of which grips a crosspin 10 on the bushing by engaging with the upper side thereof, while the other spring presses against the lower side of a slightly downwardly projecting dog 13 on the lower end of bushing 9. The upper leaf spring 11 thus presses the upper arm 6 against blades 2 and retains the same in this position. The two leaf springs 11 and 12 which carry the upper swing or pressure arm 6 are secured to the back rail 14 of the cutting mechanism by means of a pin 16 and a bolt 17 with a nut 18 thereon. Bolt 17 is threaded into the lower spring 12 which is tightened when nut 18 is tightened against back rail 14. It is thus possible to adjust the tension of the two springs 11 annd 12 and therefore also the pressure at which the swing arms 6 are pressed against the two cutters.

Swing arm 19 is rotatably mounted within a bushing 20 through an interposed rubber sleeve 21. Bushing 20 is inserted into an aperture in a bracket 22 which is riveted 25 to the back rail 14, and it may be adjusted relative to rail 14 and clamped to bracket 22 by a bolt and nut 23 which tighten the bracket on the angular end 19' of arm 19 contained in bushings 20. Thus, the lower swing arm 19 is also adjustable relative to the lower cutter 5. Since the springs 11 and 12 effectively press against the lower spring arms 19, for example, which are stationary insofar as they are concerned, the lower swing arms 19 form the back rests for the spring presusre of the upper swing arms 6. Each lower arm 19 is provided with an upwardly extending portion with a hook 24 thereon which projects over the back of rail 1 and thereby limits the distance to which the two cutters may spread apart if any solid objects such as small rocks or the like have entered between them.

Figure 4:
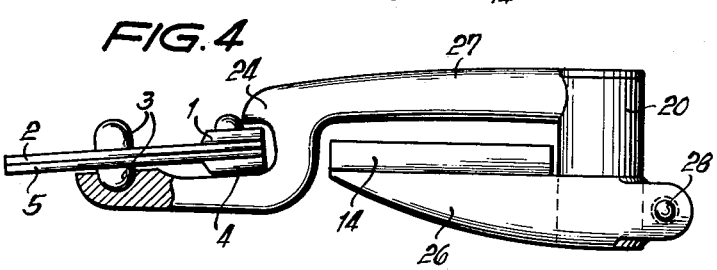
FIGURE 4 shows a view similar to FIGURE 3 illustrating a modification of the lower swing or pressure arm.
Figure 5:
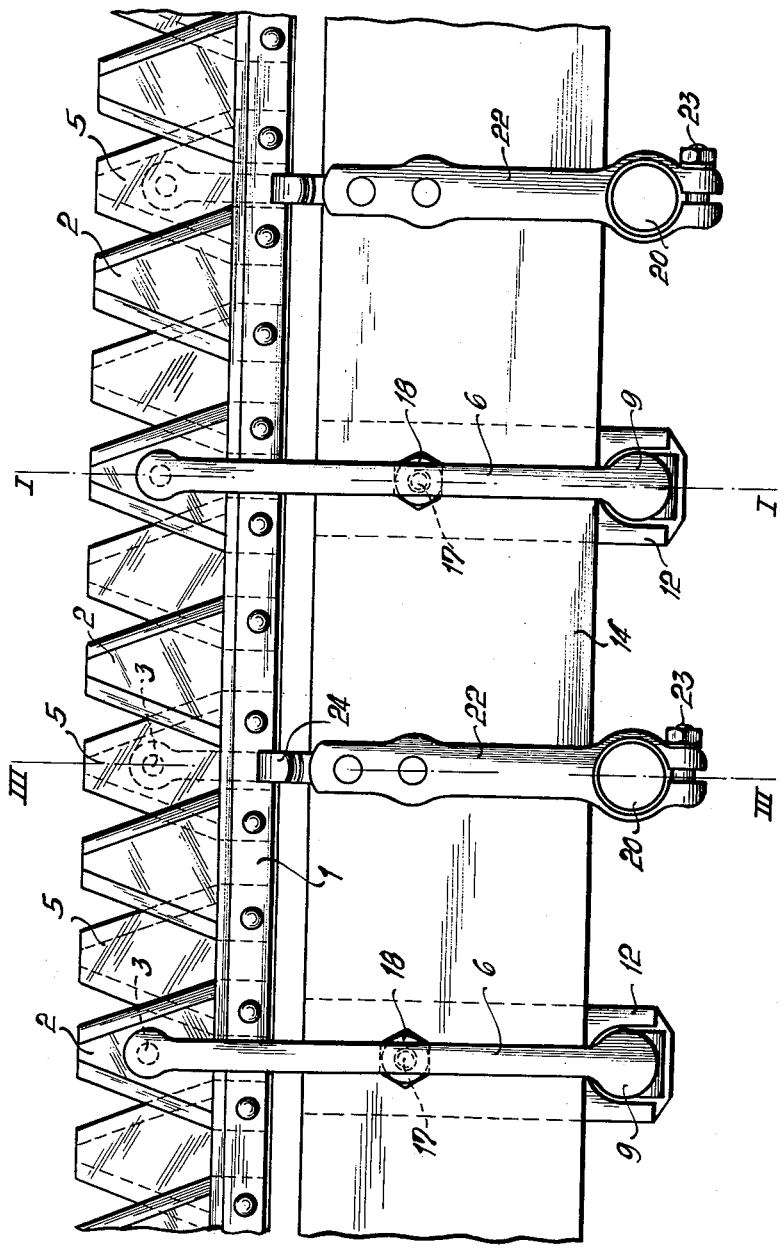
FIGURE 5 shows a partial plan view of the cutting mechanism according to FIGURES 1 to 3.

In the modification of the lower swing or pressure arm 27 as illustrated in FIGURE 4, the latter is made of an angular shape and mounted above back rail 14 by means of a bracket 26 on the lower side of rail 14, and it is adjustable relative to back rail 14 and thus also relative to the lower cutter 5 by a clamping bolt 28 on bracket 26.

Also in this case, the lower swing arms 27 form the back rests for the spring pressure of the upper swing arms 6 in the same manner as the swing arms 19. Since the lower swing arms 19 or 27 are adjustable in the vertical direction with respect to the brackets 22 and 26, respectively, they may be properly set relative to each other and relative to the lower cutter 5, also for the purpose of compensating for any changes in the cutting mechanism caused by the wear thereof.

Figure 2:
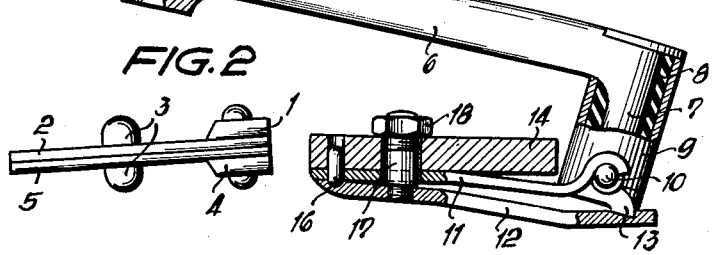
FIGURE 2 shows a view similar to FIGURE 1 but with the upper swing arm pivoted to the raised position.

If the cutter blades 2 and 5 are worn and have to be replaced, the upper swing arms 6 are pivoted upwardly by hand or by means of a tool to the position as illustrated in FIGURE 2. Bushings 9 on arms 6 then pivot about the axes of their crosspins 10 until dogs 13 snap into recesses 29 in the lower springs 12 and thereby lock arms 6 in the raised position. Thereupon, both sets of cutter blades 2 and 5 may be removed and replaced.

Figure 6:
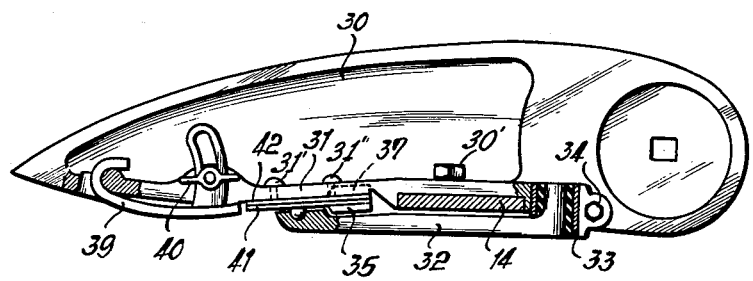
FIGURE 6 shows a cross section of the cutting mechanism illustrating the outer shoe thereof with parts broken away for purposes of illustration.
Figure 7:
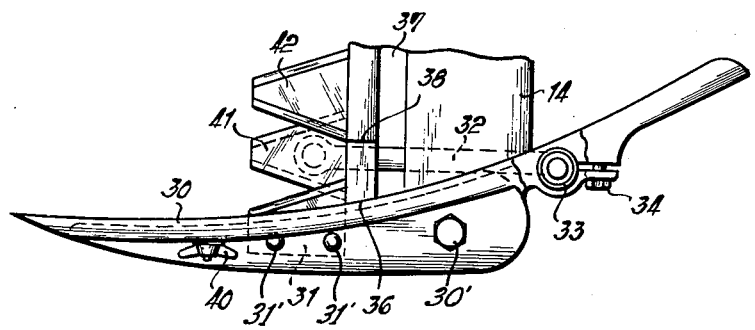
FIGURE 7 shows a plan view of the outer shoe according to FIGURE 6.

The guide levers which press the cutter blades resiliently against each other are mounted in the outer shoe and inner shoe of the cutting mechanism as follows:

The outer shoe 30, as shown in FIGURES 6 and 7, is secured to back rail 14 by a bolt 30', for example, and has a shoe plate 31 riveted 31' thereto. The lower swing arm 32 is inserted into the slotted bushing 33 of the outer shoe 30 and may be adjusted to different vertical positions and secured by means of a bolt 34. The back rail 35 of the lower cutter blades 41, corresponding to back rail 4 of FIGURE 1, terminates at 36, while the back rail 37 of the upper cutter blades 42, corresponding to back rail 1 of FIGURE 1, terminates at 38. The slide member 39 is adjustable relative to the ground by a setscrew 40. In FIGURES 6 and 7, the cutter blades are illustrated in their central position. The lower blade 41, when in its outer dead-center position, engages underneath shoe plate 31, while when in its inner dead-center position it lies underneath the upper cutter blade 42.

Figure 3:
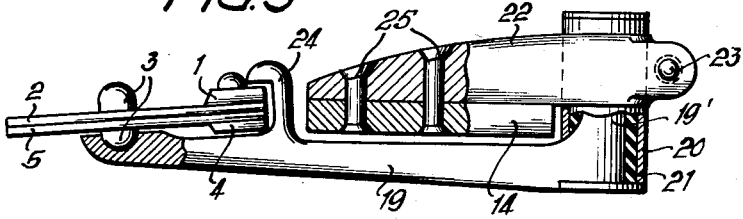
FIGURE 3 shows a similar cross section of the cutting mechanism taken along section line III—III of FIGURE 5 and illustrating one of the lower swing or pressure arms with parts broken away for purposes of illustration.
Figure 8:
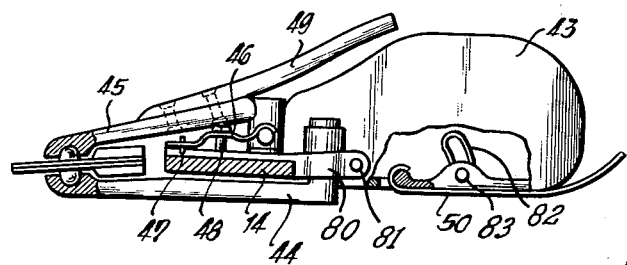
FIGURE 8 shows a cross section of the cutting mechanism illustrating a modified form of an outer shoe together with an upper and a lower swing or pressure arm with parts broken away for purposes of illustration.

In the embodiment according to FIGURE 8, the outer shoe 43 is mounted on back rail 14 by means of bracket 80 and bolt 81 and carries the lower swing arm 44 in the same manner that the lower swing arm 19 is mounted on the back rail 4 in FIGURE 3. The upper swing arm 45 is held in position by a leaf spring 46 which is connected to the outer shoe by a pin 47 and tightened by a bolt 48. The upper swing arm 45 carries a deflector 49 which separates the material to be harvested in front of the upright wall of the outer shoe 43. The slide member 50 is adjustable in the vertical direction by a set screw 83 which tightens against a bearing member containing slot 82.

Figure 9:
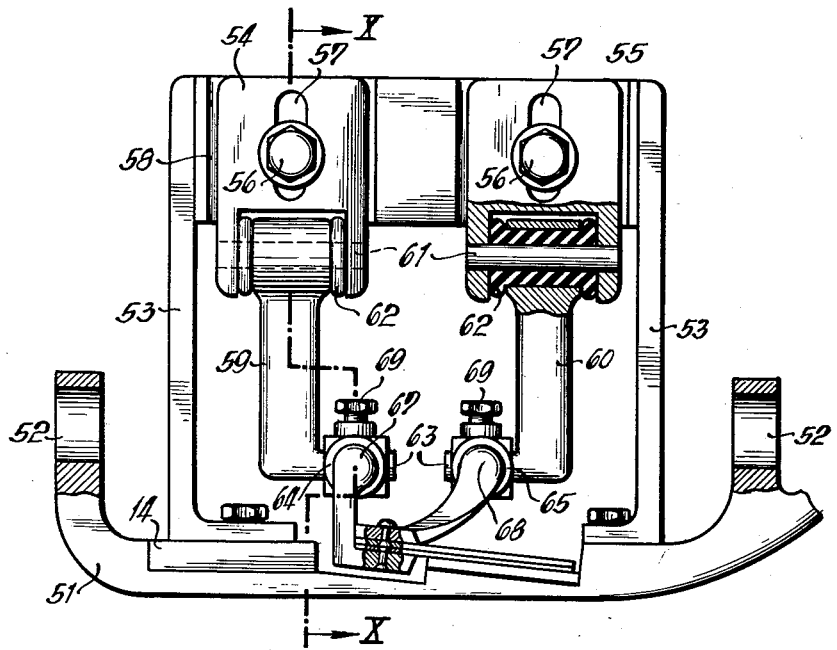

The inner shoe 51 according to FIGURE 9 is connected in the usual manner to the reaper frame, not shown, by means of hinge joints 52, and it carries the back rail 14. Shoe 51 carries a yoke 53 on which bearings 54 and 55 are mounted so as to be adjustable to different vertical positions by bolts 56 in elongated holes 57. In order to facilitate the vertical adjustment of bearings 54 and 55, they may be guided by lateral guide ways 58. Bearing 54 pivotably supports the swing arm 59 for the lower cutter blade, while bearing 55 pivotably supports swing arm 60 for the upper cuter blade, for example, by means of a bearing pin 61 which is mounted in the bearing and surrounded by a rubber bushing 62 which is mounted in swing arm 60. The angular ends 63 of the swing arms carry clamping members 64 and 65 which are likewise pivotably mounted thereon by means of rubber bushings 66. In the direction toward the cutting mechanism, the clamping members 64 and 65 are pivotably connected to driving rods 70, for example, by means of ball-and-socket joints 71.

This construction of the bearings of the swing arms permits the upper and lower cutters to be resiliently pressed against each other adjacent to the inner shoe. It is advisable first to adjust the lower cutter to a suitable elevation by a corresponding vertical adjustment of bearing 54, and then to lower bearing 55 so as to press the upper cutter against the resilience of the rubber bushings 62 and 66 upon the lower cutter so as to be under a spring bias.

In order to facilitate the vertical adjustment of bearings 54 and 55, it is also possible to provide a setscrew or a threaded spindle by means of which the bearings may be adjusted in a vertical direction after the clamping bolts 56 have been loosened. The bearing blocks may also be mounted on the so-called claw or hinge members of the reaper frame so as to be adjustable in the vertical direction.

Figure 10:
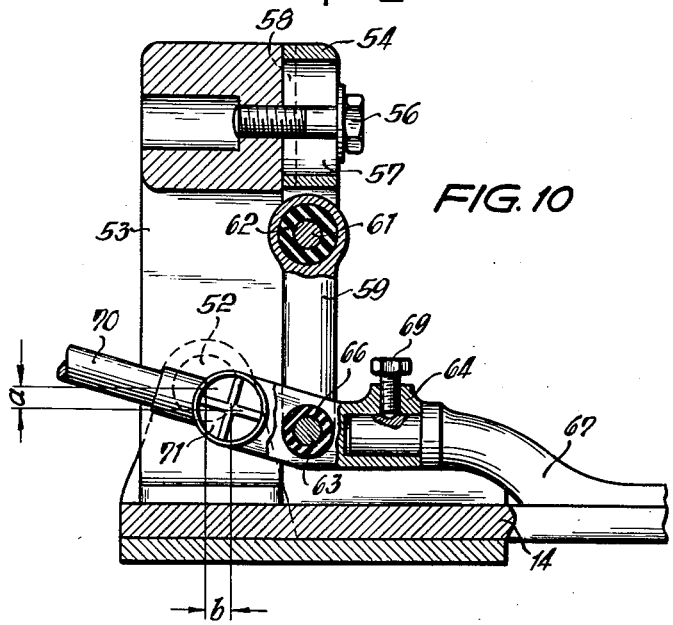
FIGURE 10 shows a cross section taken along line X—X in FIGURE 9.

For setting the reaper in the vertical position, it is advisable when the cutters are in the neutral position to make the vertical distance $a$ between the center of rotation of the hinge joints 52 and the center of the connection of the driving rods 70 to the clamping members 64 and 65 equal to the horizontal distance $b$ between these two centers, as indicated in FIGURE 10. This will prevent any distortion in the length of the driving rods when the reaper beam is set in the vertical position.

The constant resilient contact pressure between the cutters produced by the swing arms insures that the cutter blades will always be in the proper engagement with each other and produce a perfect cut. Any impurities entering between the cutters are automatically eliminated therefrom by the reciprocating movement of the cutters. The cutter blades are not mounted on the cutter rail in the conventional manner so as to abut against each other, but at a distance from each other which is smaller than the width of the cutter blades. The chafing effect of the edges of the blades will thus increase the self-cleaning action also within the area of the cutter back. The construction of the upper swing arms according to the invention as compared with the cutting mechanisms of the reapers according to prior designs also considerably facilitates the removal and replacement of the cutters.

The present invention is not limited to the particular embodiments as described herein and illustrated in the accompanying drawings. Thus, for example, the swing arms adjacent to the inner shoe do not have to assume a vertical position as shown and described, but they may also extend horizontally like the other swing arms, and their bearings may be mounted on the inner shoe itself. Since the driving rods often extend at a steep angle, it is then advisable to make these bearings of the swing arms in the inner shoe of a very strong construction and of a considerable length. The swing arms may then also be mounted at both sides of the arm leading to the cutter. These swing arms do not engage with the cutter blades but with the clamping members through bearing elements similarly as the vertical swing arms.

Having thus fully disclosed my invention, what I claim is:

1. A cutting mechanism for reapers comprising two cutters adapted to be reciprocated relative to each other, means for reciprocating at least one of said cutters to provide said relative reciprocation of the cutters, and supporting means for said cutters resiliently pressing the same together and including a supporting rail, a plurality of swing arms supporting and guiding said cutters during said relative reciprocatory movement, said swing arms being distributed over the entire length of said cutters, each of said swing arms having an angular bearing end, means for mounting each said swing arm on said supporting rail including a bushing for pivotally mounting said bearing end, said bushing being operatively secured to said supporting rail, a rubber sleeve within said bushing and interposed between said bushing and said bearing end, and means for adjusting said bushing in a vertical direction relative to said bearing end of the swing arm, said rubber sleeve and said bushing allowing limited pivotal movement of said swing arm.

2. A cutting mechanism as defined in claim 1, wherein said swing arms include a plurality of upper swing arms extending over said cutters, and further including an upper and a lower leaf spring for resiliently securing the bushing of each upper swing arm to said supporting rail, said upper swing arm having a crosspin in its bearing end, said upper leaf spring engaging over said crosspin and forming a horizontal pivot of said upper swing arm to permit said arm to be pivoted upwardly and out of engagement with the upper cutter, said lower leaf spring engaging with the lower end of said bearing end.

3. A cutting mechanism as defined in claim 2, in which said lower leaf spring has a recess, and said lower end of said bearing end has a dog projecting downwardly therefrom and adapted to engage into said recess when said upper swing arm is pivoted upwardly to arrest said arm in said raised position.

4. A cutting mechanism as defined in claim 1, wherein said swing arms include a plurality of lower swing arms extending below said cutters, and further including means for rigidly securing said bushing of each of said lower swing arms to said supporting rail, each of said lower swing arms having a hook-shaped member thereon engaging over said upper cutter and limiting the distance to which said cutters can separate from each other.

5. A cutting mechanism as defined in claim 1, wherein said plurality of swing arms include a plurality of upper swing arms and a plurality of lower swing arms, and wherein said angular bearing end of each of said upper and lower swing arms is disposed at the rear of said supporting rail so that each of said swing arms extend over and beyond said supporting rail, each of said lower swing arms having a rear part with said angular bearing end thereon disposed above said supporting rail, and a front part bent downwardly and extending substantially parallel to said rear part and underneath said lower cutter.

6. A cutting mechanism as defined in claim 1, wherein said two cutters are arranged one above the other and each of said swing arms supports a respective one of said cutters, the swing arms for the upper cutter and the swing arms for the lower cutter being arranged in a laterally offset relationship.

7. A cutting mechanism as defined in claim 1, wherein each of said swing arms has a free end and a recess in said free end, and in which each of said cutters has projections on its outer face engaging into said recesses in said swing arms so that said swing arms and said cutters will be compelled to follow the same movements.

8. A cutting mechanism as defined in claim 3, wherein said swing arms include a plurality of lower swing arms, and further including means for rigidly securing said bushing of each of said lower swing arms to said supporting rail, each of said lower swing arms having a hook-shaped member thereon engaging over said upper cutters and limiting the distance to which said cutters can separate from each other.

9. A cutting mechanism for reapers comprising upper and lower cutter means adapted to be reciprocated relative to each other, each of said cutter means including a back rail and a plurality of cutting blades secured thereto, means for reciprocating at least one of said cutter means to provide said relative reciprocation of the cutter means, and supporting means for said cutter means resiliently pressing the same together and including a supporting rail, said cutter means being arranged in front of and spaced from said supporting rail, a plurality of upper and lower swing arms distributed over the length of said cutter means and extending, respectively, over and under said cutter means, and means securing said swing arms to said supporting rail whereby said swing arms form means for supporting and guiding said cutter means during said reciprocatory movement including means for pivotally mounting said swing arms on said supporting rail so that said swing arms pivot with said reciprocatory movement, said cutter means following said swing arms during said reciprocatory movement.

10. A cutting mechanism as defined in claim 9, wherein said plurality of upper and lower swing arms are alternately arranged above and below said cutter means.

11. A cutting mechanism as defined in claim 8, further including an outer shoe, at least one of said swing arms being adjustably secured to said outer shoe.

References Cited in the file of this patent

UNITED STATES PATENTS

| 708,146 | Johnston | Sept. 2, 1902 |
| 708,147 | Johnston | Sept. 2, 1902 |
| 2,687,001 | Valentine | Aug. 24, 1954 |
| 2,736,156 | Hardman | Feb. 28, 1956 |
| 2,823,506 | Irving | Feb. 18, 1958 |

FOREIGN PATENTS

| 278,907 | Germany | Oct. 7, 1914 |
| 549,690 | Germany | Apr. 30, 1932 |